United States Patent [19]

Busico et al.

[11] Patent Number: 4,777,216

[45] Date of Patent: Oct. 11, 1988

[54] PROCESS FOR PRODUCING ATACTIC POLYOLEFIN POLYMERS

[75] Inventors: Vincenzo Busico; Paolo Corradini, both of Naples; Vito Savino, Giugliano, all of Italy

[73] Assignee: Dureco Chemicals, Inc., Yorktown Heights, N.Y.

[21] Appl. No.: 10,295

[22] Filed: Jan. 30, 1987

Related U.S. Application Data

[63] Continuation-in-part of Ser. No. 698,615, Feb. 6, 1985, abandoned.

[51] Int. Cl.⁴ .......................... C08F 297/08; C08F 4/02
[52] U.S. Cl. .................................. 525/268; 525/247; 525/319; 525/322; 525/323
[58] Field of Search ............... 525/247, 319, 322, 323, 525/268

[56] References Cited

U.S. PATENT DOCUMENTS

| | | | |
|---|---|---|---|
| 3,923,758 | 12/1975 | Carter et al. | 526/152 |
| 4,298,713 | 11/1981 | Morita et al. | 525/247 |
| 4,308,357 | 12/1981 | Kaus et al. | 525/247 |
| 4,520,163 | 5/1985 | Goodall | 525/268 |
| 4,576,994 | 3/1986 | Dorrer et al. | 525/268 |

*Primary Examiner*—Wilbert J. Briggs, Sr.
*Attorney, Agent, or Firm*—Brumbaugh, Graves, Donohue & Raymond

[57] ABSTRACT

The invention relates to a process for the controlled polymerization of alpha-olefins selected from the group consisting of propylene and butylene in order to form a polymer containing by weight about 10% to 30% isotactic polyolefin, 25% to 70% atactic polyolefin and 0% to 65% by weight of an amorphous ethylene/olefin copolymer which process comprises combinations of the steps of:

(a) homopolymerizing the alpha-olefin at a temperature of from about 0° C. to about 90° C. (preferably from about 20° C. to about 60° C.) in the presence of a high yield catalyst comprising a titanium compound supported on activated $MgCl_2$ and metal alkyl compound wherein the metal is selected from the group consisting of the metals of groups II and III of the Periodic Table for a first period of time;

(b) adding a comonomer such as ethylene to the system; and (c) copolymerizing the alpha-olefin and the comonomer with stirring in order to assure a more uniform composition of the reacting phase at a temperature of from about 0° C. to about 90° C. in the presence of the same catalyst as used in step (a), for a second period of time, wherein said first period of time exceeds said second period of time. The mole fraction of comonomer in the reacting phase is from about 1% to about 300% of the mole fraction of alpha-olefin.

7 Claims, No Drawings

PROCESS FOR PRODUCING ATACTIC POLYOLEFIN POLYMERS

BACKGROUND OF THE INVENTION

For a number of years, atactic polypropylene has been mixed with asphaltic bitumen for use in roofing materials and road paving. Atactic polypropylene, as used herein, is a substantially stereo irregular, non-crystalline polypropylene fraction that is usually produced as a by-product in the polymerization of propylene to form isotactic polypropylene, and which is separated from the isotactic material by solvent extraction. Depending on the industrial process, the soluble polymer fraction may also contain substantially amorphous ethylene/propylene copolymers and, in a lower amount, "tails" of isotactic polypropylene. This material is referred to herein as waste polypropylene.

Because of its non-crystalline structure atactic and waste polypropylene has not been widely used in the polymer industry. In recent years, however, several uses have been found for atactic polypropylene and it is now sold for use in mixing with asphalt to form strong, durable roofing materials, see for example U.S. Pat. No. 4,368,228 to Romolo Gorgati.

Since atactic and waste polypropylene is currently produced as a polymer by-product and is not a staple commercial product, the continued supply and consistency of this "waste" material is uncertain.

SUMMARY OF THE INVENTION

It is the object of this invention to develop a controlled method of synthesis for a polymeric polyolefin based material which has a consistent and reproducible composition similar to the composition of commercially available waste atactic polypropylene. The composition in combination with other materials such as asphalt or bitumen has useful properties for example in roofing materials.

As the uses of atactic and waste polypropylene increased, users of atactic polypropylene sought reliable synthetic alternatives which would produce the same or better polymeric material as a primary product. To this end, chemical analyses were performed on samples from batches of commercially available waste atactic polypropylene (DELAWAX available from Dureco Chemicals, Inc., Delaware). It was concluded that on the average the "waste" atactic material was a polymeric mixture which generally had the following composition (by weight):
about 20% to 30% isotactic polypropylene,
about 30% to 45% atactic polypropylene.
about 25% to 50% amorphous ethylene/propylene copolymer.

It has now been found that a known high yield catalyst comprising a titanium compound supported on an activated magnesium halide and a metal alkyl compound wherein the metal is selected from the group consisting of the metals of Groups II and III of the Periodic Table can be used in a controlled polymerization reaction of propylene and ethylene to produce a polymer mixture which contains by weight about 10% to 30% and preferably about 15% to about 25% isotactic polypropylene, about 25% to 70% and preferably about 35% to about 60% atactic polypropylene and about 10% to 70% and preferably about 25% to 55% ethylene/propylene copolymer.

The process comprises combinations of the steps of:
(a) homopolymerizing an alpha-olefin at a temperature of from about 0° C. to about 90° C. (preferably from about 20° C. to about 60° C.) in the presence of a high yield catalyst comprising a titanium compound supported on an activated magnesium halide and a metal alkyl compound wherein the metal is selected from the group consisting of the metals of groups II and III of the Periodic Table for a first period of time;
(b) adding a comonomer such as ethylene to the system; and
(c) copolymerizing the alpha-olefin and the comonomer with stirring in order to assure a more uniform composition of the reacting phase at a temperature of from about 0° C. to about 90° C. (preferably from about 20° C. to about 60° C.) in the presence of the same catalyst as used in step (a), for a second period of time, wherein said first period of time exceeds said second period of time. The mole fraction of comonomer in the reacting phase is from about 1% to about 300% (preferably from about 10% to about 50%) of the mole fraction of the alpha-olefin.

By varying the sequence and the duration of the steps, monomer pressures, and polymerization temperature during the reaction, atactic polyolefin based polymer mixtures with predetermined compositions can be achieved. In particular, to achieve a polymeric product having properties suitable for use with asphalt in roofing materials, the extent of homopolymerization should be greater than the extent of copolymerization. Preferably, the duration of the homopolymerization steps is at least twice the duration of the copolymerization steps.

DETAILED DESCRIPTION OF THE INVENTION

Catalysts suitable for use in producing atactic polypropylene based polymer are disclosed in Belgian Patent Nos. 742,003, 742,112 and 754,152. These catalysts are efficient high yield supported catalysts which produce high yields of polymer per gram of titanium. They also produce a clean polymer which is practically free from titanium catalyst contamination. These catalysts are known to have high activity in the polymerization of ethylene to linear polymers but were not used industrially for polymerizing alpha-olefins such as propylene or alpha-butylene since they produced predominantly polymers of low tacticity which was considered to be undesirable.

The catalyst comprises a titanium compound supported on activated manganese or magnesium halide, such as $MgCl_2$, and a metal alkyl compound wherein the metal is selected from the metals of Groups II and III of the Periodic Table. The preferred metal alkyl compounds for use in preparing the catalyst contains aluminum as the central atom linked to alkyl radicals such as methyl, ethyl, n-propyl, isobutyl and n-hexadecyl. The preferred compounds for use in the catalyst are aluminum triethyl $Al(C_2H_5)_3$, aluminum triisobutyl, $Al(i-C_4H_9)_3$ and/or mixtures thereof.

The titanium compound used in the catalyst can be for example $TiCl_2$, $TiCl_3$, $TiCl_4$, $TiCl_2(OR)_2$, $TiCl(OR)_3$, $Ti(OR)_4$, wherein R is alkyl. The preferred titanium compound is $TiCl_4$. The molar ratios in the preferred catalyst between titanium compound and metal alkyl are in the range of about 1:1 to 1:1000 and preferably on the order of 1:10 to 1:200 for titanium tetrachloride and aluminum triethyl. The quantity of Ti present on the magnesium halide support is generally between 0.1% and 10% by weight expressed as Ti metal.

Activated forms of manganese and magnesium halides, especially $MgCl_2$, are used to support the catalyst. They can be obtained, for example, by fine milling and in general by any other known physical method in which the particles of the $MgCl_2$ support are subjected to the action of friction and/or shearing forces or by known chemical methods. The milling is preferably effected in the dry state in a ball-mill in the absence of inert diluents.

The high yield supported catalyst used in this invention can be prepared according to various known methods. A preferred method consists of contacting the $MgCl_2$ with a Ti compound under conditions at which the resulting supported catalyst has a surface area higher than about 3 $m^2/g$. This can be accomplished for example by dry milling the $MgCl_2$ support in the presence of a Ti compound.

The polymerization process can be carried out in the liquid phase either in the presence or in the absence of an inert diluent (such as, for example, n-heptane), and comprises combinations of the steps of:

(a) homopolymerizing an alpha-olefin having at least three carbon atoms, preferably selected from the group consisting of propylene and butylene at a temperature of from about 0° C. to about 90° C. (preferably from about 20° C. to about 60° C.) in the presence of a high yield catalyst comprising a titanium compound supported on activated $MgCl_2$, and a metal alkyl compound wherein the metal is selected from the group consisting of the metals of groups II and III of the Periodic Table for a first period of time;

(b) adding a comonomer selected from the group consisting of ethylene, propylene and butylene to the system, said comonomer being different from said alpha-olefin; and (c) copolymerizing the alpha-olefin and the comonomer with stirring in order to assure a more uniform composition of the reacting phase at a temperature of from about 0° C. to about 90° C. (preferably from about 20° C. to about 60° C.) in the presence of the same catalyst as used in step (a), for a second period of time, wherein the total duration of homopolymerization exceeds the total duration of copolymerization. The mole fraction of comonomer in the reacting phase is from about 1% to about 300% (preferably from 10% to 50%) of the mole fraction of alpha-olefin.

Atactic polypropylene products having the desired composition, i.e. 10% to 30% isotactic polypropylene, about 25% to 70% atactic polypropylene, and about 10% to 70% ethylene/propylene copolymer (by weight), are obtained when the above two reaction steps are carried out under conditions such that the number of chain-lengthening reactions occurring during the homopolymerization step is greater than the number of chain lengthening reactions during the copolymerization step. Preferably, the duration of the homopolymerization steps will exceed the duration of the copolymerization steps by a factor of at least 2.

The molecular mass of the polymer can be regulated with known chain transfer agents, typically hydrogen.

The process of synthesizing an atactic polypropylene based polymer according to this invention is explained by the following examples. These examples are given only as an illustration and are not meant to limit the invention.

EXAMPLE 1

In nitrogen atmosphere 20 g of anhydrous $MgCl_2$ and 0.8 g of $TiCl_4$ were transferred into a sealed 500 ml porcelain jar half filled with 15 mm diameter stainless steel spheres. The jar was then placed on a mill and the contents rotated at 200 rpm for 72 hours. At the end of milling, the catalyst was collected and transferred under a nitrogen atmosphere onto a porous diaphragm. It was washed with anhydrous n-heptane and vacuum dryed. An elemental analysis reveals that the product contained 2.0 g % Ti by weight.

100 ml of anhydrous n-heptane to which 3.8 mmol of $Al(C_2H_5)_3$ and 60 mg of this catalyst (1.2 mg Ti equivalent to $2.6 \times 10^{-2}$ mmol) had previously been added, were fed into a one liter autoclave equipped with a magnetically driven agitator and a temperature control system. With continuous agitation 260 g of propylene were fed into the autoclave which reached a pressure of 16 bar, with a constant temperature of 50° C.

After 7 minutes of propylene homopolymerization, the autoclave pressure was brought to 20 bar with ethylene and the autoclave was maintained at that pressure with ethylene for 15 minutes. The ethylene flux was thereafter interrupted and polymerization was allowed to proceed for a total of 1 hour at 50° C. Because of the higher activity of ethylene, the ethylene was essentially entirely depleted and polymerization rapidly became a homopolymerization again. The copolymerization time therefore amounted to about 20 minutes or 33% of the 1 hour total polymerization time. 50 ml of methanol were fed into the autoclave in order to halt polymerization. The polymer was collected, cooled and washed in acetone, and vacuum dryed. The yield was 140 g (sample No. DUCO 402).

DUCO 402 was 20% by weight insoluble in boiling n-heptane (24 h fractionation in Kumagawa extractors at 15 passes/h).

The intrinsic viscosity of the heptane-insoluble fraction was $[\eta] = 2.4$ dl/g (measured at 135° C. in tetralin).

The heptane-soluble fraction contained atactic polypropylene and an amorphous ethylene/propylene copolymer (approximately 47% and 33% by weight respectively, based on the weight of the whole sample); the intrinsic viscosity was $[\eta] = 1.5$ dl/g, and the glass transition temperature $T_g = -24°$ C. (determined by DSC at a scanning rate of 10° C./min).

Temperature control in the apparatus used for this Example was not optimum, and there was therefore some question as to the precise partial pressures of ethylene present throughout the copolymerization step and thus the duration of copolymerization. To remedy this problem, a new apparatus with better temperature control was used in the subsequent examples.

EXAMPLE 2

Anhydrous $MgCl_2$ (20 g) and $TiCl_4$ (0.8 g) were placed and sealed under argon in a 0.51 porcelain jar containing 2 kg of 12 mm diameter stainless steel balls. The jar was kept for 120 hours on a rotating mill operating at 200 rpm. The catalyst, recovered under argon, contained 2.0 g % Ti metal.

3.9 mmol of Al-triethyl in 50 ml of n-heptane were introduced into the autoclave, in which a glass vial containing 62 mg of this catalyst had been placed. 330 g of polymerization grade propylene were added, and the reaction system thermostated under stirring at 50° C. Polymerization was then started by breaking the catalyst vial. After 29 min of propane homopolymerization, ethylene was fed at a partial pressure of 8 bar, and ethylene/propene copolymerization allowed to proceed for 6 min; the process was then stopped by injection of 50 ml of methanol.

The polymer (sample 09-DUK7) was collected, washed with acetone and dried under vacuum (yield 210 g). The following composition was determined with solvent fractionation and $^{13}$CNMR methods:

| | |
|---|---|
| isotactic polypropylene (n-heptane insoluble) | 19 g % |
| atactic polypropylene | 35 g % |
| ethylene/propylene copolymer (26 mol % ethylene) | 46 g % |

The intrinsic viscosity (determined at 135° C. in tetralin) of the n-heptane insoluble fraction was 1.8 dl/g; that of the n-heptane soluble fraction 0.9 dl/g.

EXAMPLE 3

The experimental procedure described in Example 1 was repeated (50 mg of catalyst suspended in 100 ml of n-heptane containing 2.1 mmol of Al(C$_2$H$_5$)$_3$) except that, before the catalyst was introduced into the autoclave, hydrogen was fed in at a pressure of 0.2 bar as a chain transfer agent.

The polymer yield was 160 g (sample no. DUCO 501).

DUCO 501 was 19% by weight insoluble in boiling n-heptane (24 h fractionation in Kumagawa extractors at 15 passes/h).

The intrinsic viscosity of the heptane-insoluble fraction was $[\eta] = 1.6$ dl/g (measured at 135:C in tetralin).

The heptane-soluble fraction was constituted of atactic polypropylene and of an amorphous ethylene/propylene copolymer (approximately 44% and 37% by weight respectively, referred to the whole sample); the intrinsic viscosity was $[\eta] = 0.9$ dl/g, and the glass transition temperature $T_g = -21°$ C. (determined by DSC at a scanning rate of 10° C./min).

EXAMPLE 4

The procedure was identical with that described under Example 2 (33 mg of catalyst; 2.1 mmol of Al-triethyl in 60 ml of n-heptane; 410 g of propylene), except that hydrogen was added as a chain transfer agent at a partial pressure of 2.5 bar after 17 min of propylene homopolymerization.

The polymer (sample 09-DUK13; yield 280 g) had the following composition:

| | |
|---|---|
| isotactic polypropylene (n-heptane insoluble) | 14 g % |
| atactic polypropylene | 36 g % |
| ethylene/propylene (30 mol % ethylene) | 50 g % |

The intrinsic viscosity (determined at 135° C. in tetralin) of the n-heptane insoluble fraction was 1.6 dl/g; that of the n-heptane soluble fraction 0.5 dl/g.

EXAMPLE 5

The procedure was identical with that described under Example 2 (50 mg of catalyst; 3.2 mmol of Al-triethyl in 50 ml of n-heptane; 440 g of propylene), except that propylene homopolymerization lasted 23 min, ethylene/propylene copolymerization 12 min.

The polymer (sample 09-DUK11; yield 240 g) had the following composition:

| | |
|---|---|
| isotactic polypropylene (n-heptane insoluble) | 13 g % |
| atactic polypropylene | 24 g % |
| ethylene/propylene copolymer (30 mol % ethylene) | 63 g % |

EXAMPLE 6

Propylene homopolymerization was started as described in Example 2 (75 mg of catalyst; 3.1 mmol of Al-triethyl in 50 ml of n-heptane; 330 g of propylene), in the presence of hydrogen (partial pressure 0.5 bar). After 25 min., ethylene (32 g) was fed into the reactor. Within 10 min. the reactor pressure resumed the value prior to ethylene addition (18 bar), in consequence of ethylene consumption. Further hydrogen was introduced (partial pressure 2.5 bar), and propylene homopolymerization allowed to continue up to a total polymerization time of 60 min. (total homopolymerization time 5 min.; copolymerization time 10 min.).

The polymer (yield 300 g) had the following composition:

| | |
|---|---|
| isotactic polypropylene (n-heptane insoluble): | 17 g % |
| atactic polypropylene | 40 g % |
| ethylene/propylene copolymer (33 mol % ethylene) | 43 g % |

The intrinsic viscosity (determined at 135° C. in tetralin) of the n-heptane insoluble fraction was 1.3 dl/g; that of the n-heptane soluble fraction was 0.5 dl/g.

COMPARATIVE EXAMPLE 1

The procedure was identical with that described under Example 2 (30 mg of catalyst; 1.8 mmol of Al-triethyl in 50 ml of n-heptane; 250 g of propylene), except that propylene homopolymerization lasted 15 min, ethylene/propylene copolymerization 20 min at an ethylene partial pressure of 10 bar.

The polymer (sample 09-DUK8; yield 200 g) had the following composition:

| | |
|---|---|
| isotactic polypropylene (n-heptane insoluble) | 5 g % |
| atactic polypropylene | 9 g % |
| ethylene/propylene copolymer (48 mol % ethylene) | 86 g % |

The importance of having the homopolymerization step exceed the copolymerization step is demonstrated by the results of the Examples as summarized in Table I.

TABLE I

Summary of Test Results

| Example | % homo time | % co time | % isotatic | % atactic |
|---|---|---|---|---|
| 1 | ~67 | ~33 | 20 | 47 |
| 2 | 83 | 17 | 19 | 35 |
| 3* | 67 | 33 | 19 | 44 |
| 4** | 83 | 17 | 14 | 36 |
| 5 | 66 | 34 | 13 | 24 |
| 6*** | 83 | 17 | 17 | 40 |
| Comp. 1 | 43 | 57 | 5 | 9 |

*0.2 bar H$_2$
**2.5 bar H$_2$ for part of polymerization
***0.5–2.5 bar H$_2$

From this comparison, it is clear that the polymers prepared under conditions where homopolymerization does not exceed copolymerization do not have compositions within the desired range.

The polymerization reaction described herein can be used to produce polymeric mixtures containing high percentages (typically about 30% to about 50% by weight) of atactic polyolefin polymers in combination with isotactic polyolefins and olefin/ethylene amorphous copolymers. The resulting polymeric mixtures have been found, for example, to be good replacements for commercially available "waste" and atactic polypropylene such as Delawax and should be useful for applications in which "waste" or atactic polypropylene was used. It is expected that the atactic polypropylene based polymer products of this invention will be particularly useful in road paving as well as for roofing applications.

We claim:

1. A process for the controlled polymerization of alpha-olefins to form a polymer containing by weight about 10% to 30% isotactic polyolefin, 25% to 70% atactic polyolefin, and 10% to 70% of an amorphous ethylene/oefin copolymer which process comprises the steps of:
   (a) polymerizing propylene at a temperature of from about 0° C. to about 100° C. in the presence of a high yield catalyst comprising a titanium compound supported on a materila selected from the group consisting of activated magnesium and magnesium dihalides and a metal alkyl compound wherein the metal is selected from the group consisting of groups II and III of the Periodic Table;
   (b) adding from 1 mole % to 300 mole %, based upon the amount of propylene, of ethylene to the propylene; and
   (c) copolymerizing the propylene with the ethylene with stirring in order to assure a more uniform composition of the reacting phase at a temperature of from about 0° C. to about 100° C. in the presence of the same catalyst as used in step (a), wherein said polymerization of propylene alone is carried out for a total period of homopolymerization time, and said copolymerization is carried out for a total period of copolymerization time, and wherein said total period of homopolymerization time exceeds said total period of compolymerization time.

2. A process as described in claim 1, wherein the support is $MgCl_2$.

3. A process as described in claim 2, wherein the metal is aluminum.

4. A process as described in claim 3, wherein the metal alkyl compound is selected from the group consisting of aluminum triethyl, aluminum triisobutyl and mixtures thereof.

5. A process as described in claim 4, wherein the titanium compound is $TiCl_4$.

6. A process as described in claim 1, wherein the homopolymerization is carried out at about 20° C. to about 60° C. and the mole fraction of ethylene is from about 10% to about 50%.

7. A process as described in claim 1, wherein said total period of homopolymerization time exceeds said total period of copolymerization time by at least a factor of two.

* * * * *